Feb. 27, 1945.   J. HIRMANN   2,370,538
CATHODE
Filed Feb. 24, 1943   2 Sheets-Sheet 1
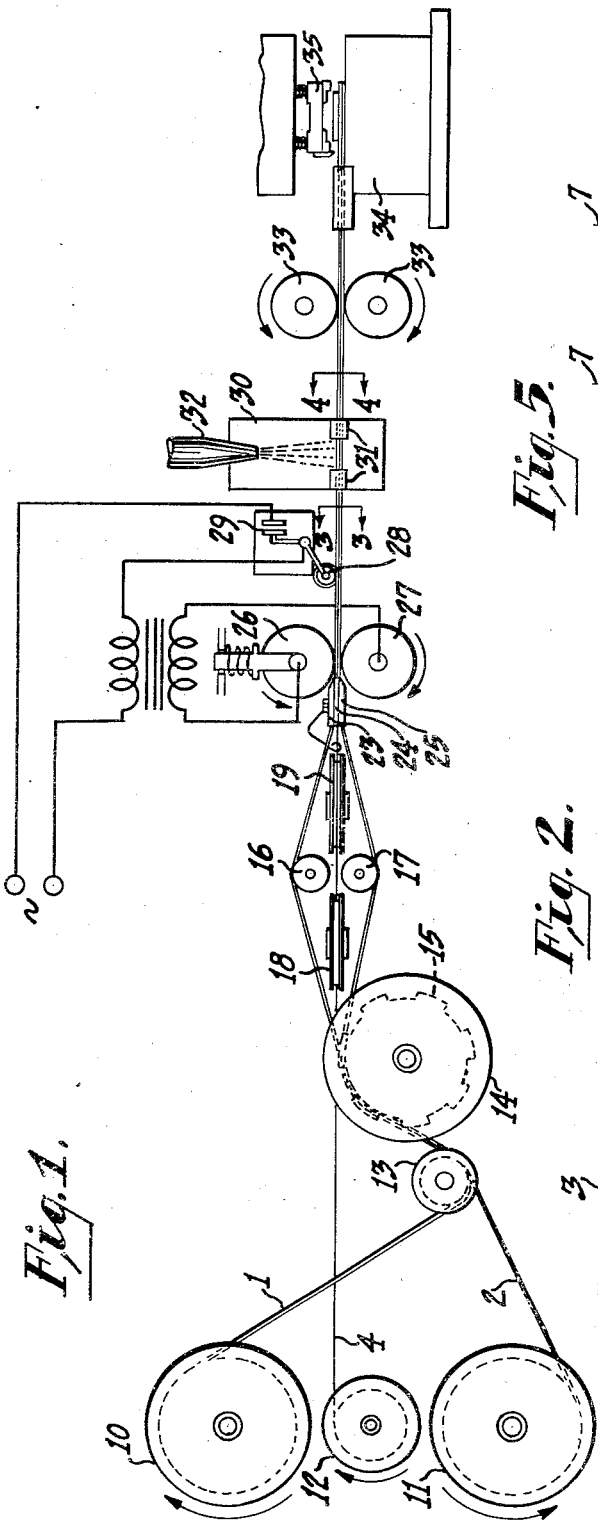
Inventor
JULIUS HIRMANN
By Charles McClair
Attorney

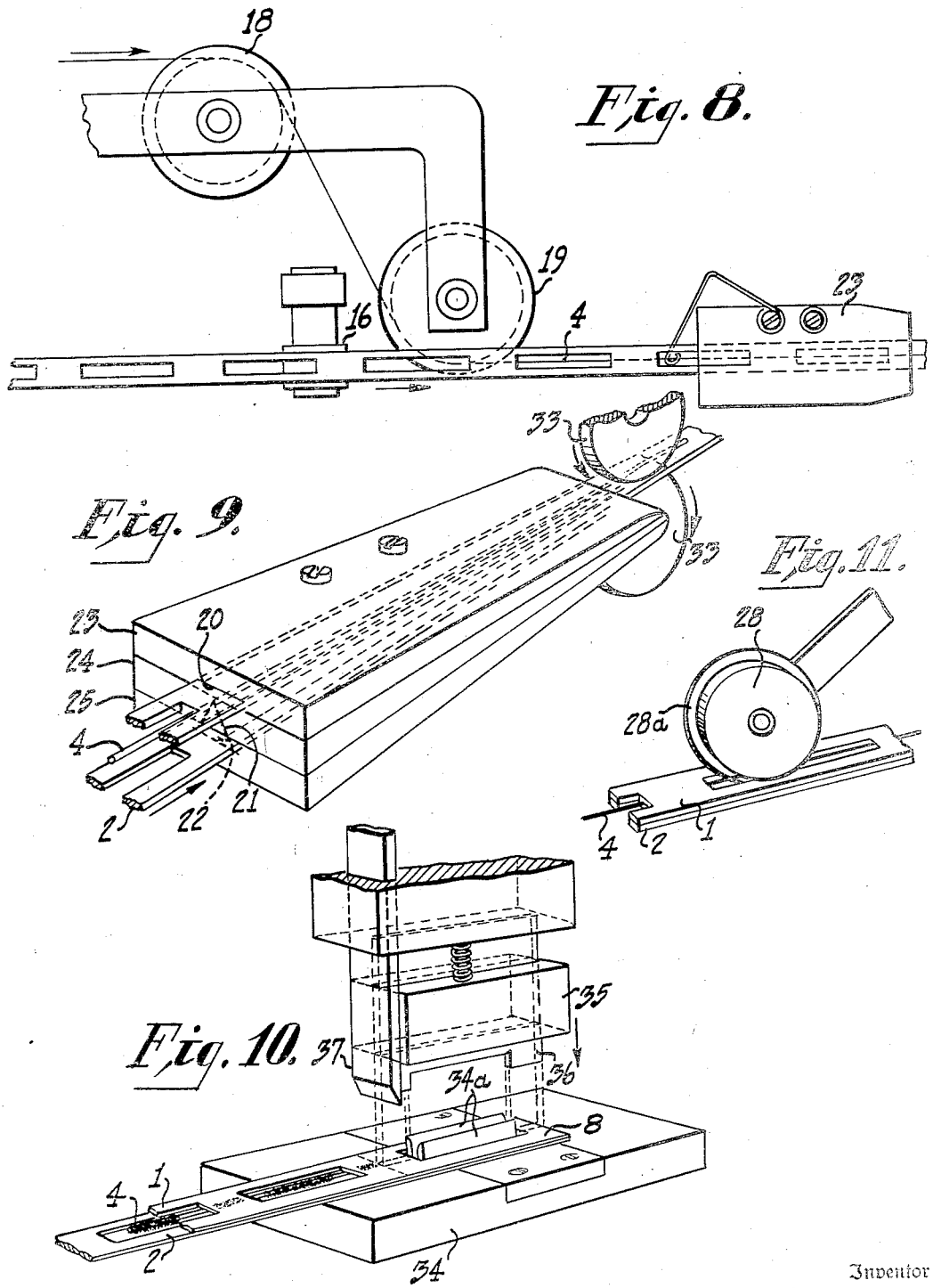

Patented Feb. 27, 1945

2,370,538

UNITED STATES PATENT OFFICE 2,370,538

CATHODE

Julius Hirmann, Hillside, N. J., assignor to Radio Corporation of America, a corporation of Delaware Application February 24, 1943, Serial No. 476,906

7 Claims. (Cl. 219—4)

My invention relates to cathodes, particularly to cathodes of the filamentary type for use in radio tubes and the like, and to methods and means for making such cathodes.

Filaments of the type used in radio tubes and the like are lengths of fine wire welded at their ends to relatively heavy lead-in conductors. To prevent excessive breakage, it has been found necessary to affix to the ends of each filament light metal tabs which in turn are attached by welding to the conductors. Because of the smallness and fragility of the filament wire it is not practical to weld the wire to the side of a single rectangular piece of sheet metal. Apparently the welding heat necessary to weld a fine wire, such as tungsten, to a tab of nickel imbrittles the wire in the weld region so that a slight tension on the wire will break it.

The principal object of my invention is an improved tabbed filamentary cathode.

Another object of my invention is an improved method of attaching metal tabs to filamentary cathodes.

Still another object of my invention is an improved machine for attaching metal tabs to filamentary cathodes.

My improved filamentary cathode comprises a wire with two sheet metal pieces on opposite sides of the wire, the two pieces being welded together and to the wire. The weld region, however, terminates short of or inwardly from the edge of the metal pieces from which the wire extends. The unwelded edge portion of the metal pieces flares outwardly and away from the wire so as to provide a slightly tapered funnel or ferrule for supporting the wire adjacent its point of attachment to the metal pieces.

The novel method of fabricating my improved tabbed cathodes comprises blanking windows between the sides of and uniformly spaced along two metal ribbons, which are superimposed one on the other with the windows in registry. Filament wire is fed between the ribbons so that the wire lies substantially midway between the edges of the ribbons and lengthwise of the windows. The sandwiched wire and ribbons are fed between welding electrodes, which weld together the contacting portions of the ribbons and wires. Finally the portions of the ribbon along the sides of the windows are cut away, leaving a completed filament with attached tabs.

The characteristic features of my invention are defined in the appended claims and the preferred embodiment of a novel machine for making my new tabbed cathode is described in the following specification and shown in the accompanying drawings in which Figure 1 is a diagrammatic elevational view of my improved tabbed cathode making machine, Figures 2, 3, 4, 5 and 6 show, respectively, metal ribbon and wire during the successive steps involved in making my improved cathode, Figure 6 showing the finished tabbed cathode and two pieces of waste ribbon, Figure 7 is an enlarged longitudinal sectional view of the weld region of my novel tab and cathode, Figure 8 is a plan view of the ribbon and wire feeding mechanism seen in elevation in Figure 1, Figure 9 is a perspective detailed view of guiding dies for feeding the sandwiched ribbons and wire to the welding electrodes, and Figure 10 is a detailed perspective view of one die for removing the unwanted portions of the ribbon from the tabbed cathode.

Figure 11 shows a trigger for the welding circuit.

Two metal ribbons 1 and 2, each of the type shown in Figure 2, are cut or blanked out to provide a plurality of uniformly spaced windows 3 between the edges of the ribbon. The two ribbons are then superimposed one on the other with the filament wire 4 between the two ribbons and substantially midway between the edges of the ribbons so that the wire extends lengthwise of the windows. The ribbons are welded together in the region indicated at 5, Figure 3, to secure the wire and the two ribbons together. While the filament wire is thus framed in the windows, the wire may, if desired, be coated with the electron emissive material 6, such as barium strontium carbonates. Thereafter the ribbon is cut along lines 7, preferably midway between the ends of the windows as shown in Figure 5, and the side rails 8 of the window frame are cut away adjacent the weld region as shown in Figure 6, leaving the finished tabbed cathode of Figure 7.

One machine for performing the operations suggested in Figures 2 to 7 is shown by way of example in Figure 1. Two reels 10 and 11 carry blanked out ribbon of the type shown in Figure 2 and reel 12 carries the filament wire. The two ribbons pass over idling roller 13 and on to the flanged sprocket wheel 14 having sprocket teeth 15 shaped and sized to accurately mesh with the windows of the ribbons. The ribbons, hence, are pulled lengthwise with respect to each other to positively bring the windows of the two ribbons into exact registry. Upon leaving the sprocket wheel the two ribbons are spread apart over the two idling rollers 16 and 17 to permit introduction of the wire between the ribbons. The wire passes over two flanged idling and guide pulleys 18 and 19, and as best shown in Figure 8, the periphery of pulley 19 is tangent to the center line of the ribbons, so that the wire feeds to a position midway between the sides of the ribbons. The wire and two ribbons pass through channels 20, 21 and 22 of the guide blocks 23, 24 and 25, shown in greater detail in Figure 9, and hence between welding electrodes 26 and 27, preferably of the roller type. The weld rollers are pressed together by suitable springs or weights. Welding current is passed through the ribbon between the welding rollers as the ribbons pass, the welding current being switched on and off by a feeler or trigger mechanism 28 for actuating the switch 29 in the primary circuit of the welding transformer. The trigger may comprise a wheel as shown in Figure 11 carried on the switch arm and adapted to move upward or downward as the windows of the ribbon pass under the wheel. A narrow flange 28a on the wheel may be so guided as to drop into the window on one side of the wire to accentuate the travel of the switch arm. The weld timing mechanism is so adjusted that welding starts and stops short of the ends of the windows so that a small amount of unwelded ribbon surrounds the wire at the points where the wire emerges from the ribbon in the windows.

The welded wire and ribbon may be wound directly on reels, as it leaves the welding electrodes, and stored for future use. For chemical reasons it is not desirable to apply the electron emissive material to the filament wire until just before the filaments are to be mounted in radio tubes. Since the wire is mechanically protected between the attached metal ribbons, the wire is conveniently handled and processed without danger of injury to the wire. By way of illustration, the wire is coated immediately upon leaving the welding electrodes. The welded wire and ribbon assembly is shown in Figure 1 as passing through a spraying chamber 30 having masking plates 31 and a spray nozzles 32 adjusted to coat the exposed wire over the desired portion of its length between the ends of the ribbon windows. For this purpose it is preferred to move the wire step by step through the spraying chamber, the portion of the wire to be sprayed being brought to rest between the masking plates 31.

The ribbon-wire assembly is drawn through the machine by driving rollers 33. The drag of the reels, pulleys and welding electrodes is sufficient to keep the ribbon under a slight tension. From the driving rollers, the wire-ribbon assembly may then be pushed directly into the cutoff dies, shown in greater detail in Figure 10, where the unwanted portions of the ribbon are removed. These dies comprise a base block 34 with two upwardly extending and slightly outwardly flared lips 34a which may pass upwardly through each window on either side of the filament wire. Above the base block is reciprocably mounted a hold-down die 35 carrying a spring biased blanking tool 36 for cutting the ribbon along and parallel to the weld region. Where tabs are desired on both ends of the finished filament, the cutoff knife 37 severs the ribbon midway between the ends of the windows. In the particular die shown in Figure 10 the filament with its tabbed ends is pushed downwardly through a central opening in the base block and the unwanted side rails 8 of the ribbon are removed as by a blast of air.

The particular guiding dies for aligning the ribbons and wire under the welding electrodes, best shown in Figure 9, comprise an upper and lower block 23 and 25 channeled at 20 and 22 to accurately guide the lengthwise travel of the ribbons. The center block is provided with a V-shaped groove 21, the apex of the groove being positioned midway between the edges of the channels for the ribbons. The three blocks are preferably tapered toward their outlet end so that the guides may be moved between the welding rollers and close to the point of contact between the rollers and ribbon, thus eliminating the possibility of relative shifting between the wire and ribbons before welding takes place.

Good results have been obtained in sandwiching a tungsten-molybdenum filament wire .0005 inch (one half of one thousandth of an inch) in diameter between two nickel ribbons, each .001 inch thick and .125 inch wide with windows about .062 inch wide and .50 inch long, and with .250 inch spaces between the windows. Tabs .125 inch long and about .010 inch wide may be attached to both ends of the filament wire at the rate of about 3600 or more complete filaments per hour with little or no damage to the wire, although the .0005 inch wire is so fine it may be broken with a strong draft of air.

One outstanding advantage of my new tabled filament is that the wire will not break at or near the weld region, although the wire in the tab may be imbrittled by the weld heat. When wire of a metal as refractory as tungsten or tungsten-molybdenum alloy is pressed by welding electrodes against soft sheet metal, such as nickel, the welding current melts only the nickel, and the wire is pushed into the surface of the nickel. The embedded portion of the wire hence is sharply bent and strained and apparently contributes to the tendency of the wire to break. However, when two pieces of nickel are pressed against opposite sides of the wire and welded, as taught by my invention, there is no tendency for the wire to bend near the nickel. Further, when the weld region terminates at a point removed from the edges of the two nickel pieces, as when the welding current through electrodes 26 and 27 is switched on or off as the ribbon passes through the welding electrodes so that the weld region terminates short of or inward from the end edges of the windows, the unwelded edge portions of the nickel ribbon flare slightly to provide a funnel or ferrule slightly tapered away from the wire. Hence, ductile wire unaffected by the weld heat extends into and between the two nickel pieces. No bending force can be applied to the wire at the weld region and the wire can be broken only by direct pull.

My novel tabbed filaments display no tendency to break adjacent tabs and no special care need be observed in welding the tabs to heavy wires or lead-in conductors. My novel machine is easy to maintain, is inexpensive to operate and requires no skilled labor.

I claim:

1. A machine for attaching tabs to filament wires comprising a sprocket wheel with teeth adapted to mesh with apertured metal ribbons, guide blocks with ribbon channels in approximate alignment with the periphery of said sprocket wheel and welding electrodes having cooperating welding surfaces in alignment with and close to said channels, and a pulley journalled on an axis normal to the axis of said sprocket wheel with the periphery of the pulley tangent to said line between the guide block and sprocket wheel to feed said wire into position between said ribbons.

2. A machine for joining together two apertured ribbons on opposite sides of a centrally disposed wire, comprising a flanged sprocket wheel having sprocket teeth shaped and sized to accurately mesh with the apertures of the ribbon windows, guide blocks with channels for aligning the ribbons and wire disposed along a line substantially tangent to the periphery of said sprocket wheel, idling pulleys in the plane of said sprocket wheel, between said sprocket wheel and said blocks, and on opposite sides of said line, and a flanged wire idling pulley between said sprocket and blocks with its periphery substantially tangent to said line, and welding electrodes adjacent and on opposite sides of said blocks, and means for drawing said ribbons and wire over said pulleys through said channels and between said welding electrodes.

3. In a machine for making a composite strip consisting of a pair of superposed metal ribbons having spaced identical apertures and a wire interposed between said ribbons and extending lengthwise of said ribbons across said apertures, a pair of welding electrodes, feed mechanism for superposing and maintaining said apertured metal ribbons with corresponding apertures in registry comprising a movable member having a tooth which fits snugly into and extends through both corresponding apertures in the superposed ribbons and movable to pass the superposed ribbons between said welding electrodes, mechanism for feeding a wire into place between and lengthwise of said superposed ribbons, and control means synchronized with said feed mechanism for passing welding current between said welding electrodes while only the ribbon portions intermediate the apertures are between said welding electrodes.

4. In a machine for making a composite strip consisting of a pair of superposed continuous metal ribbons having spaced identical apertures and a continuous wire interposed between said ribbons and extending lengthwise of said ribbons across said apertures, a pair of welding rollers, feed rollers on one side of said welding rollers for pulling the composite strip through said welding rollers, feed mechanism on the other side of said welding rollers for superposing said ribbons with a continuous wire interposed between and extending lengthwise of said ribbons comprising means for maintaining corresponding apertures in said ribbons in registry during the travel of said ribbons between said welding rollers, and control means for supplying welding current to said welding rollers actuated in timed relation to the travel of said ribbons.

5. In a machine for making a composite strip consisting of a pair of superposed continuous metal ribbons having spaced identical elongated apertures extending lengthwise of the ribbons and a continuous wire interposed between said ribbons and extending lengthwise of said ribbons across said apertures, a pair of welding rollers, feed rollers on one side of said welding rollers for pulling the composite strip through said welding rollers, feed mechanism on the other side of said welding rollers for superposing said ribbons with a continuous wire interposed between and extending lengthwise of said ribbons comprising means for maintaining corresponding apertures in said ribbons in registry during the travel of said ribbons between said welding rollers, and switching mechanism controlled by said apertured ribbons for passing current between said welding rollers while the ribbon portions intermediate said apertures are between said welding rollers.

6. In a machine for making a composite strip consisting of a pair of superposed continuous metal ribbons having spaced identical elongated apertures extending lengthwise of the ribbons and a continuous wire interposed between said ribbons and extending lengthwise of said ribbons across said apertures, a pair of welding rollers, feed rollers on one side of said welding rollers for pulling the composite strip through said welding rollers, feed mechanism on the other side of said welding rollers for superposing said ribbons with a continuous wire interposed between and extending lengthwise of said ribbons comprising menas for maintaining corresponding apertures in said ribbons in registry during the travel of said ribbons between said welding rollers, trigger control mechanism comprising a movable finger positioned to ride on said superposed ribbons in alignment with the apertures in said ribbons, and a switch closed by said finger to pass current between said welding electrodes when said finger is on the ribbon portions intermediate the apertures in said ribbons.

7. In a machine of the character described a pair of welding electrodes, feed mechanism for feeding between said electrodes a pair of superposed continuous metal ribbons having spaced identical rectangular apertures and an interposed continuous wire extending lengthwise of said ribbons to form a composite strip, and comprising at one side of said welding electrodes a sprocket wheel having teeth which fit into the apertures in said ribbons, means for superposing said ribbons on said sprocket wheel with corresponding apertures in said ribbons in registry and fitted over a tooth of said sprocket, a ribbon guide between said sprocket and said electrodes for guiding said superposed ribbons to said electrodes, a pair of spaced idler pulleys between said sprocket wheel and said guide on opposite sides of a straight line from the rim of said sprocket to said guide for holding said ribbons apart, a wire feeding mechanism comprising a wire guide adjacent said ribbon guide for feeding a wire into place between the ribbons in said ribbon guide, feed rollers at the other side of said welding electrodes for pulling said ribbons through said ribbon guides and between said welding electrodes, and means synchronized with said ribbons for energizing said welding electrodes while the ribbon portions intermediate the apertures in said ribbons are between said welding electrodes.

JULIUS HIRMANN.